(12) United States Patent
Katou et al.

(10) Patent No.: US 8,643,865 B2
(45) Date of Patent: Feb. 4, 2014

(54) MAINTENANCE SYSTEM AND MAINTENANCE METHOD FOR IMAGE PROCESSING APPARATUS

(75) Inventors: Hiroyo Katou, Shizuoka-ken (JP); Yoshikatsu Kamisuwa, Tokyo-to (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 358 days.

(21) Appl. No.: 13/037,563

(22) Filed: Mar. 1, 2011

(65) Prior Publication Data

US 2011/0216358 A1    Sep. 8, 2011

Related U.S. Application Data

(60) Provisional application No. 61/309,939, filed on Mar. 3, 2010, provisional application No. 61/350,617, filed on Jun. 2, 2010.

(51) Int. Cl.
*G06K 15/00* (2006.01)
*G06F 3/12* (2006.01)
*G03G 15/00* (2006.01)

(52) U.S. Cl.
USPC ............... 358/1.14; 358/1.15; 399/9; 399/10; 399/11; 399/24; 399/25; 399/26

(58) Field of Classification Search
USPC ............ 358/1.14, 1.15; 399/9, 10, 11, 24, 25, 399/26
See application file for complete search history.

(56) References Cited

U.S. PATENT DOCUMENTS

| | | | |
|---|---|---|---|
| 6,597,469 B1* | 7/2003 | Kuroyanagi | 358/1.15 |
| 7,467,841 B2 | 12/2008 | Kamisuwa et al. | |
| 7,474,988 B2 | 1/2009 | Kamisuwa et al. | |
| 7,774,169 B2 | 8/2010 | Kamisuwa et al. | |
| 2007/0010983 A1* | 1/2007 | Bauer et al. | 703/17 |
| 2009/0041478 A1* | 2/2009 | Kamisuwa et al. | 399/8 |
| 2009/0132321 A1 | 5/2009 | Kamisuwa et al. | |
| 2009/0210278 A1 | 8/2009 | Kamisuwa et al. | |

FOREIGN PATENT DOCUMENTS

| | | |
|---|---|---|
| JP | 08195849 | 7/1996 |
| JP | 2008035444 | 2/2008 |

* cited by examiner

*Primary Examiner* — Fred Guillermety
(74) *Attorney, Agent, or Firm* — Turocy & Watson, LLP

(57) ABSTRACT

According to one embodiment, a management apparatus includes an acquisition unit, a determination unit, a storage unit, a selection unit, and an output unit. The acquisition unit acquires any one of simple data or detailed data including the simple data from a plurality of image processing apparatuses. If the detailed data is acquired, the determination unit determines maintenance data to be applied to the image processing apparatus which is an output source of the detailed data. The storage unit stores the maintenance data in association with related data included in the detailed data. If the acquisition unit acquires the simple data, the selection unit selects the maintenance data associated with the related data similar to the acquired simple data. The output unit outputs the maintenance data as the data for update with respect to the image processing apparatus which is an output source of the simple data.

20 Claims, 9 Drawing Sheets

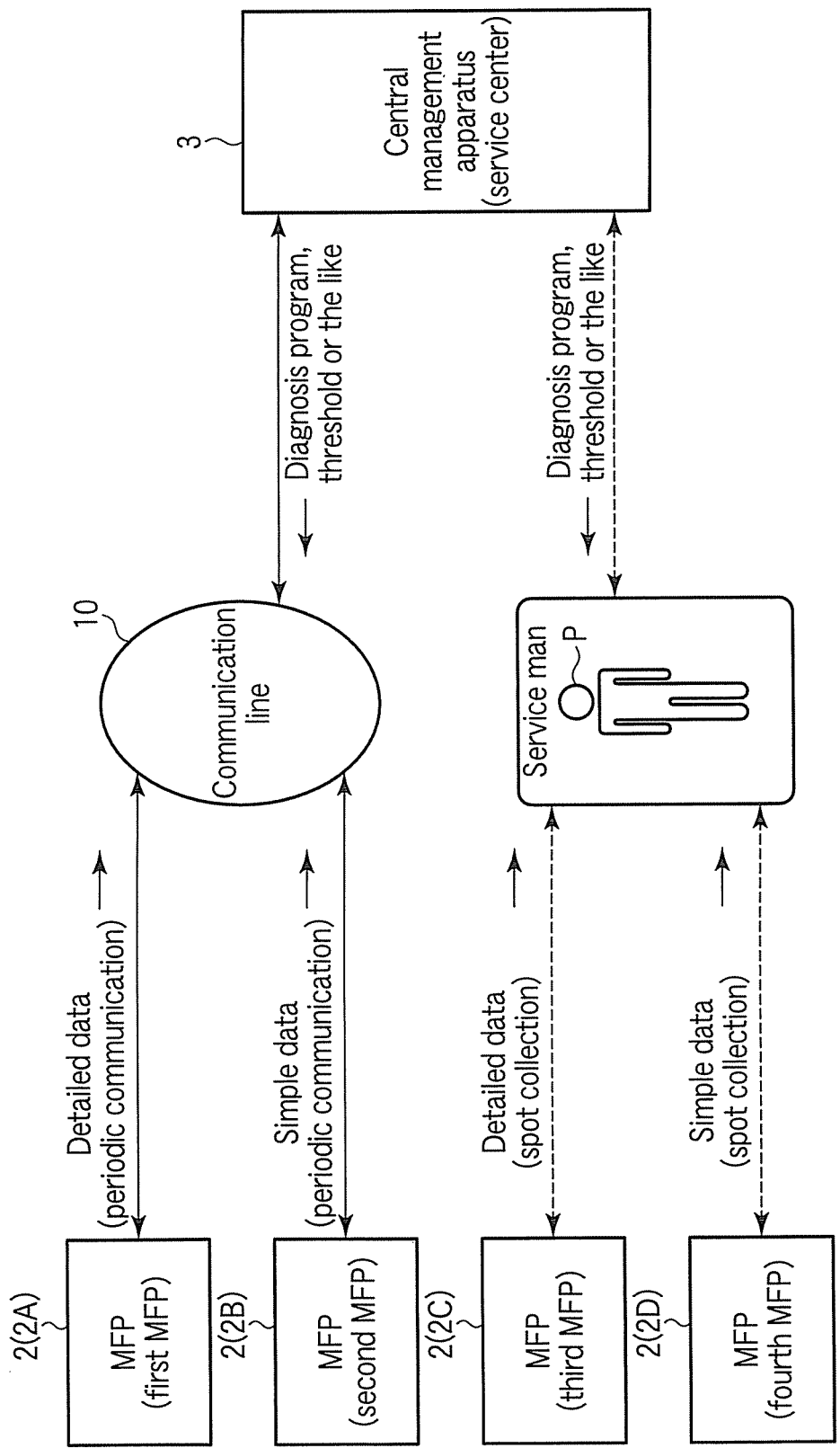
F I G. 1

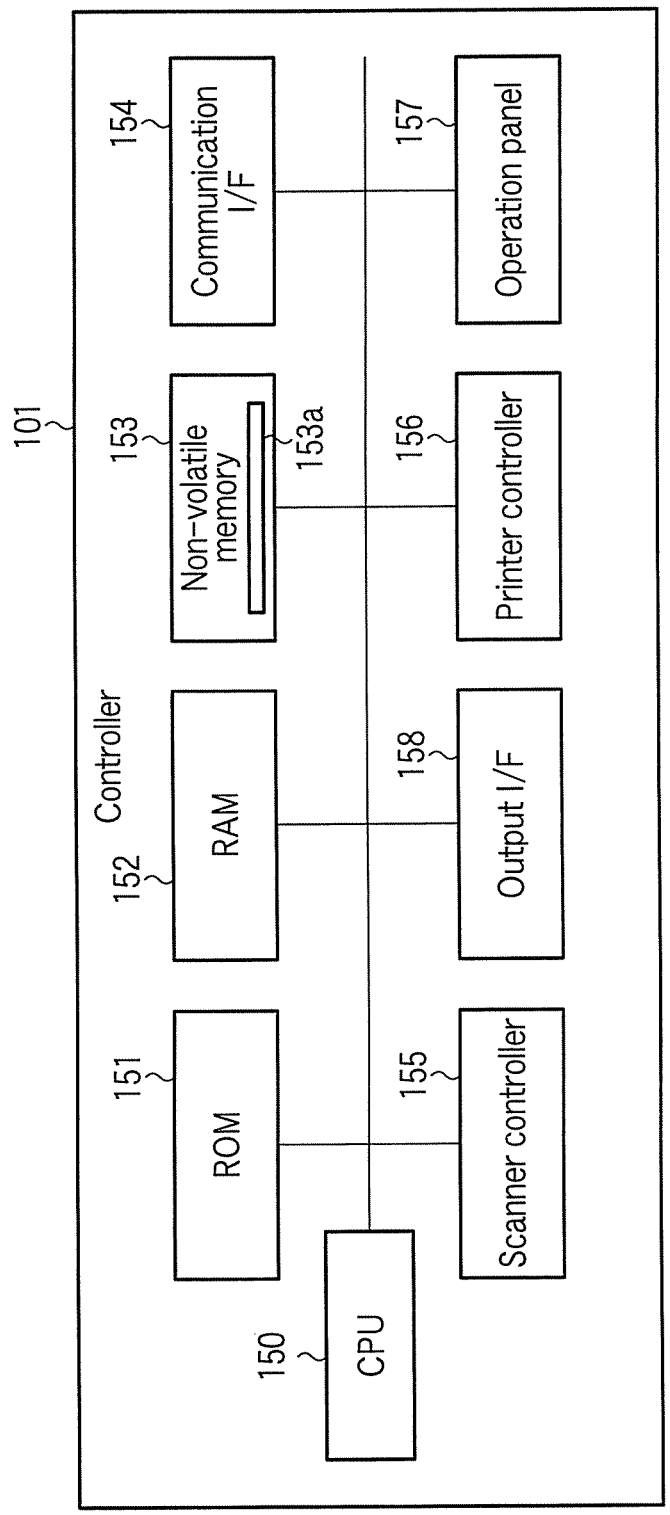
F I G. 3

| Serial No | Detailed data | TC | Color ratio | .... | Threshold of photoconductive drum (yellow) |
|---|---|---|---|---|---|
| ○○○○ | X | 589,235 | 65% | .... | 107,692 |
| △△△△ | ○ | 85,356 | 30% | .... | 233,333 |
| □□□□ | ○ | 384,454 | 76% | .... | 92,105 |
| ∗∗∗∗ | X | 12,354 | 84% | .... | 83,333 |

FIG. 7

| Serial No | Type of equipment | Detailed data | TC | MDV | Color ratio |
|---|---|---|---|---|---|
| ○○○○ | A | X | 589,235 | 12,587 | 65% |
| △△△△ | B | ○ | 85,356 | 5,639 | 30% |
| □□□□ | A | ○ | 384,454 | 20,695 | 76% |
| ∗∗∗∗ | C | X | 12,354 | 3,586 | 84% |

FIG. 8

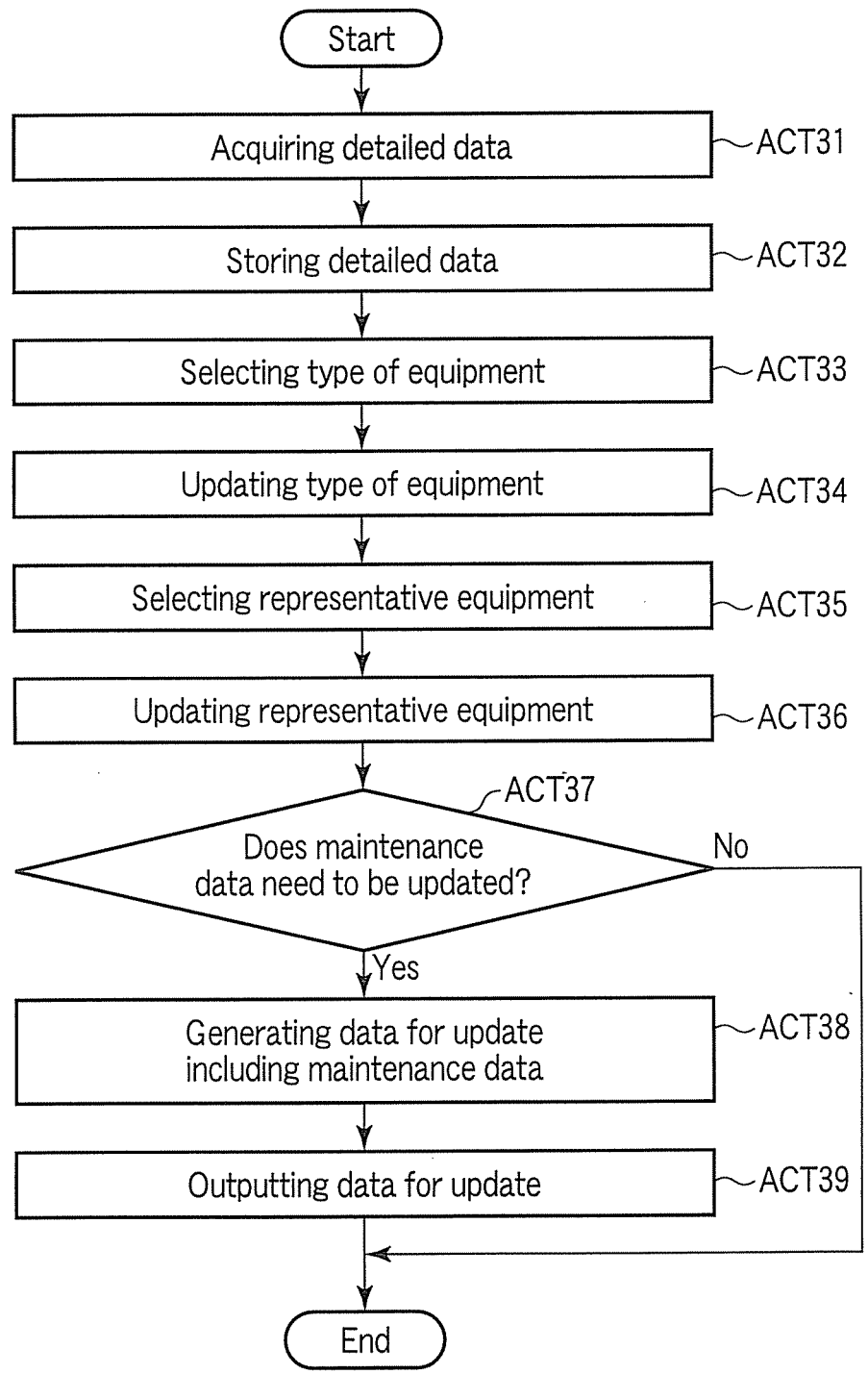
F I G. 11

MAINTENANCE SYSTEM AND MAINTENANCE METHOD FOR IMAGE PROCESSING APPARATUS

CROSS-REFERENCE TO RELATED APPLICATIONS

This application is based upon and claims the benefit of priority from U.S. Provisional Application No. 61/309,939 filed on Mar. 3, 2010; and U.S. Provisional Application No. 61/350,617 filed on Jun. 2, 2010 the entire contents of each of which are incorporated herein by reference.

FIELD

Embodiments described herein relate generally to a management apparatus managing the maintenance of an image processing apparatus, a maintenance system and a maintenance method for an image processing apparatus.

BACKGROUND

Generally, a piece of office equipment such as an image processing apparatus is required to have a high productivity. Accordingly, it is necessary to perform maintenance for the image processing apparatus to prevent a failure and promptly detect and resolve the failure if the failure occurs. There is a maintenance system in which the image processing apparatus and a management apparatus are connected to each other by communication lines to perform appropriate maintenance in respect to an image processing apparatus such as a digital multifunction apparatus. In the maintenance system, an error occurring in the image processing apparatus is transmitted from the image processing apparatus to the management apparatus. The management apparatus receiving the error notification reports the occurrence of the error to a serviceman and prompts a maintenance operation to be performed on the image processing apparatus where the error occurs. However, in practice, all the data necessary for the maintenance cannot be transmitted to the management apparatus in many cases since the image processing apparatus is operated in various manners. In the conventional maintenance system, it is not easy to perform efficient maintenance on an image processing apparatus which is installed under conditions where the data necessary for the maintenance cannot be transmitted to the management apparatus.

BRIEF DESCRIPTION OF THE DRAWINGS

FIG. 1 is a view illustrating an overview of a maintenance system.

FIG. 3 is a block diagram illustrating an example of a configuration of a control system of the digital multifunction apparatus.

FIG. 7 is a view illustrating an example of a management table storing the data relating to each digital multifunction apparatus.

FIG. 8 is a view illustrating an example of the management table including information showing the type of equipment.

FIG. 11 is a flowchart describing an update process performed by the maintenance data for each type of equipment selected from detailed data.

DETAILED DESCRIPTION

Figure 2:
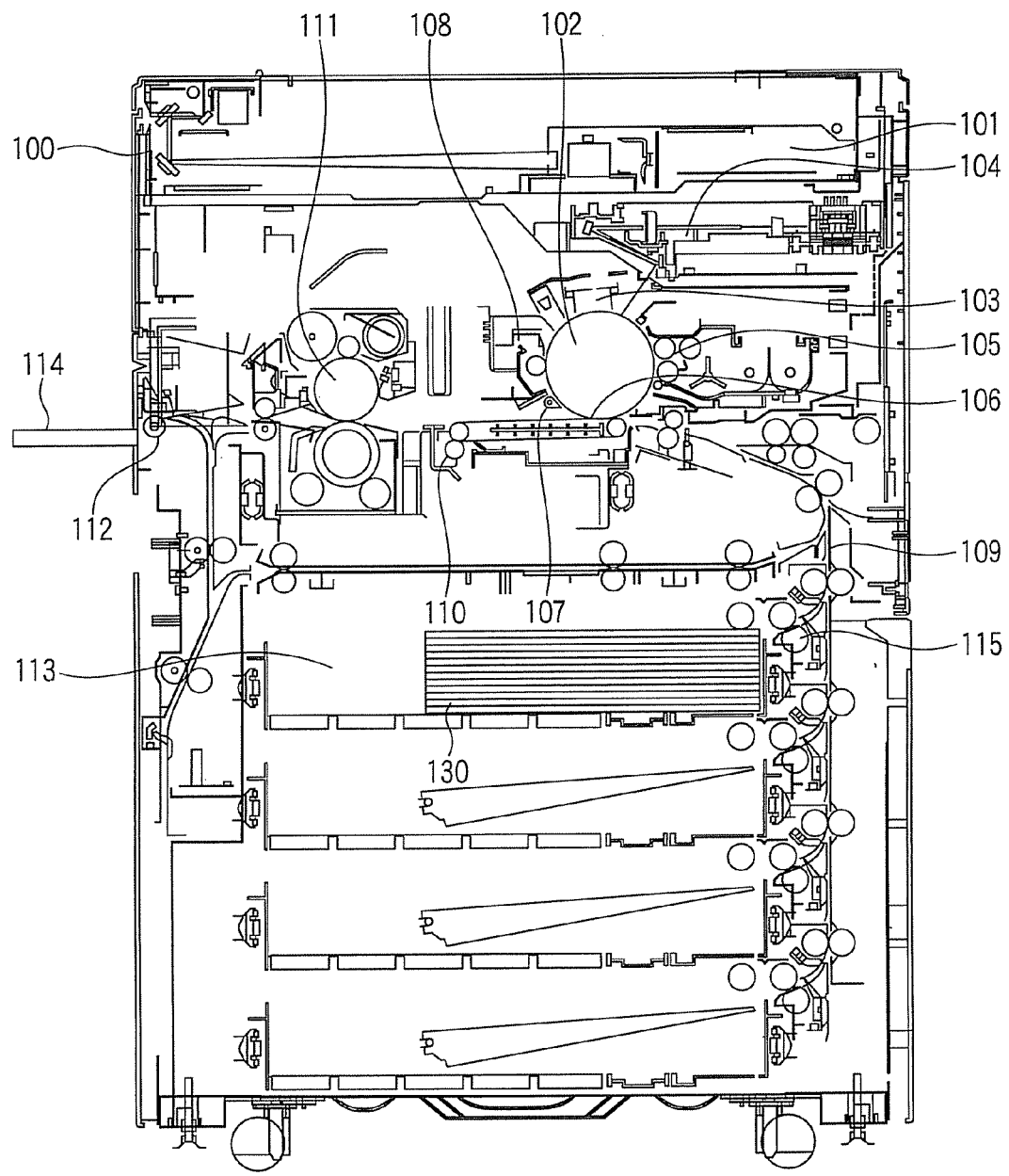
FIG. 2 is a view illustrating an example of a configuration in a digital multifunction apparatus.

In general, according to one embodiment, the management apparatus includes an acquisition unit, a determination unit, a storage unit, a selection unit, and an output unit. The acquisition unit acquires any one of simple data or detailed data including the simple data from a plurality of image processing apparatuses. If the detailed data is acquired by the acquisition unit, the determination unit determines maintenance data to be applied to the image processing apparatus which is an output source of the detailed data. The storage unit stores the maintenance data determined by the determination unit in association with related data included in the detailed data. If the acquisition unit acquires the simple data, the selection unit selects the maintenance data associated with the related data similar to the acquired simple data. The output unit outputs the maintenance data selected by the selection unit as the data for update with respect to the image processing apparatus which is an output source of the simple data.

Hereinbelow, the embodiments will be described in detail with reference to drawings.

FIG. 1 is a view illustrating an overview of the maintenance system of the image processing apparatus according to the embodiment.

The maintenance system illustrated in FIG. 1 includes a digital multifunction apparatus (MFP: Multi Function Peripheral) 2 as a plurality of image processing apparatuses (image forming apparatuses) and a management apparatus 3. The digital multifunction apparatus 2 includes, for example, a copy machine, a scanner, a printer, or various data communication functions. The digital multifunction apparatus 2 may be a device performing the image processing, or, for example, a copy machine having only a copy function. The digital multifunction apparatus 2 may also be a device having only the function of the scanner or the printer. Moreover, the digital multifunction apparatus 2 may include not only the copy function but also a function of receiving images by FAX or e-mail and a function of receiving printed images through a network. The management apparatus 3 has a function of managing the maintenance performed by a serviceman on the respective digital multifunction apparatus 2 in the maintenance system.

The respective digital multifunction apparatuses 2 are operated in various forms (for example, the usage purpose, the installation environment, and the installation conditions may vary). For instance, in some cases, the data traffic resulting from the function of data communication is restricted, and the function of data communication is stopped or omitted according to the type of operation in the digital multifunction apparatus 2. The maintenance system illustrated in FIG. 1 includes digital multifunction apparatuses 2A and 2B periodically transmitting the data to the management apparatus 3 through a communication line 10 by the function of data communication, and digital multifunction apparatuses 2C and 2D which do not perform the data communication through the communication line 10.

In the embodiment, a first digital multifunction apparatus 2A periodically transmits the detailed data to the management apparatus 3. A second digital multifunction apparatus 2B periodically transmits the simple data more simplified in its contents than the detailed data to the management apparatus 3. A third digital multifunction apparatus 2C does not transmit the data to the management apparatus 3 periodically, and outputs the detailed data according to operation of the serviceman. A fourth digital multifunction apparatus 2D does not transmit the data to the management apparatus 3 periodically and outputs the simple data by the operation of the serviceman. The data output from the digital multifunction apparatuses 2C and 2D by the operation of the serviceman is carried to a service center S by the serviceman, and is input to the management apparatus 3 by the operation of the serviceman.

In FIG. 1, a solid line illustrates the data communication performed through the communication line 10, and a dotted line illustrates the data exchange performed by a person such as the serviceman. The detailed data is information for grasping the state (a usage state, a state of consumables, and an operation state, for example) of the MFP in detail. For instance, the detailed data is the information including, for example, a counter value, a sensor value, error information, customer information, log data in the MFP and the like. The detailed data may also be all data that the MFP 2 can output. The simple data is the information having a smaller amount of data than the detailed data, for example, is a part of information included in the detailed data. As a specific example, the simple data may also be the information showing the number of sheets printed by the corresponding MFP 2. If a fee charging service is performed according to the number of prints, the MFP 2 may output the counter value of the number of prints for each of the function, color, and size and a total counter value which is a total value thereof (a total number of prints) as the simple data.

Next, in the maintenance system, the classification of the respective digital multifunction apparatus (MFP) 2 which is the target of the maintenance will be described.

In the maintenance system illustrated in FIG. 1, the digital multifunction apparatus which is the target of the maintenance is classified into four digital multifunction apparatuses of the first, the second, the third, and the fourth digital multifunction apparatuses 2A, 2B, 2C, and 2D.

The first digital multifunction apparatus (MFP) 2A periodically transmits the detailed data to the management apparatus 3 through the communication line 10. In addition to the periodic communication, the first MFP 2A transmits the data showing the contents of an event to the management apparatus 3 if an event such as an error occurs. For example, if a jam occurs, the first MFP 2A may transmit, for example, the information showing the occurred error, the value of each sensor acquired before and after the occurrence of the error, the information showing performed jobs, and the like to the management apparatus 3.

The detailed data is the data showing the operation state (usage state) of the entire device, such as the value of respective sensors and counters in the digital multifunction apparatus 2. For example, the detailed data includes, for example, the sensor values detected by various sensors, such as an output value of a sensor measuring the surface position of a photoconductive drum 102 and an output value of a sensor measuring the internal temperature and humidity of a fixing unit 111, a current life counter value of respective consumables (a counter value corresponding to the physical quantities effective for grasping the degree of deterioration of the respective consumables), and the total counter value (the total number of prints of the MFP). The detailed data may also include all data that can be output by the digital multifunction apparatus and shows the usage state.

The first MFP 2A may store the detailed data in a state information table 153a of a non-volatile memory 153. Also, the first MFP 2A may periodically extract the detailed data from the state information table 153a, and transmit the extracted detailed data to the management apparatus 3.

The second digital multifunction apparatus (MFP) 2B periodically transmits the simple data to the management apparatus 3 through the communication line 10. The simple data is the data which is more simplified than the detailed data, and includes some of the data included in the detailed data. The simple data may be the data for charging fees according to the number of prints. In many cases, the simple data used for charging fees includes, for example, the counter value including the number of color-prints, the number of monochromatic prints, the number of prints for each size, and the total counter value as the total number of prints. In the maintenance system, the simple data includes at least the total counter value.

The second MFP 2B may store the data corresponding to the detailed data in the state information table 153a of the non-volatile memory 153, for example. In this case, the second MFP 2B periodically extracts the simple data including the total counter value from the data stored in the state information table 153a and transmits the extracted simple data to the management apparatus 3.

The first and second MFP 2A, 2B include a function of receiving the data for update transmitted from the management apparatus 3 through the communication line 10. The first and second MFP 2A, 2B also include a function of updating the data relating to the maintenance (for example, a diagnosis program for the maintenance and parameters such as a threshold used for the diagnosis program) based on the data for update received by the management apparatus 3.

The third digital multifunction apparatus (MFP) 2C inputs the detailed data in the management apparatus 3 by hand by a serviceman or the like, without communicating with the management apparatus 3 through the communication line 10. The third MFP 2C has an operation form which cannot (does not need to) have the network connection with an external device (including the management apparatus 3) through the communication line 10. Therefore, the hardware configuration itself of the third MFP 2C may be the same as the first and the second MFP as long as the third MFP 2C has no network connection.

The third MFP 2C may also store the data corresponding to the detailed data in the state information table 153a of the non-volatile memory 153. In this case, in response to the operation that a serviceman P performs directly, the third MFP 2C outputs the detailed data stored in the state information table 153a by an output interface 158. The third MFP 2C can output spot collection data corresponding to the detailed data in a predetermined form by the manual operation performed by the serviceman P. The detailed data output from the third MFP 2C by the operation of the serviceman P is input to the management apparatus 3 by the manual operation performed by the serviceman P.

The fourth digital multifunction apparatus (MFP) 2D inputs the simple data in the management apparatus 3 by hand by the serviceman or the like, without communicating with the management apparatus 3 through the communication line 10. The fourth MFP 2D has an operation form which cannot (is unnecessary to) have the network connection with an external device (including the management apparatus 3) through the communication line 10. Therefore, the hardware configuration itself of the fourth MFP 2D may be the same as the first and the second MFP as long as the fourth MFP 2D has no network connection.

The fourth MFP 2D may also store the data corresponding to the detailed data in the state information table 153a of the non-volatile memory 153. In this case, in response to the operation that a serviceman P performs directly, the fourth MFP 2D outputs the data stored in the state information table 153a by an output interface 158. That is, the fourth MFP 2D can output spot collection data corresponding to the simple data in a predetermined form by the manual operation performed by the serviceman P. The data output from the fourth MFP 2D by the operation of the serviceman is input to the management apparatus 3 by the manual operation performed by the serviceman P.

The third and fourth MFP 2C, 2D include a function of inputting the data for update directly not by the data communication performed through the communication line but by the operation of the serviceman. The third MFP 2C and the fourth MFP 2D include a function of updating the data relating to the maintenance (for example, a diagnosis program for the maintenance and parameters such as a threshold used for the diagnosis program) based on the data for update acquired from the management apparatus 3 according to the operation of the serviceman and input by hand by the serviceman.

The above four classifications are made according to the operation form of respective MFPs. In other words, even in the MFPs 2 of the same model, the usage environment and the usage purpose are different for each MFP; therefore, operations in which the obtainable data or the method of acquiring the data varies are performed.

For instance, the digital multifunction apparatus having the operation form which corresponds not to the remote maintenance or the like but only to the remote fee charging service is operated as the second digital multifunction apparatus 2B. The second digital multifunction apparatus 2B corresponding only to the fee charging service notifies the management apparatus 3 not of the detailed data regarding the state of the equipment but of only the simple data such as the total counter value regarding the fee charging. In addition, in the installation environment where the transmitted data is restricted since the large capacity data cannot be transmitted for the insufficient communication environment, the digital multifunction apparatus is operated as the second digital multifunction apparatus 2B.

As described above, the digital multifunction apparatus is operated in various forms. Therefore, for the entire maintenance system, it is required that the maintenance data can be updated to the optimal value not only for the first digital multifunction apparatus 2A but also for the second digital multifunction apparatus 2B, the third digital multifunction apparatus 2C, and the fourth digital multifunction apparatus 2D. In the present maintenance system, with respect to the second digital multifunction apparatus 2B, the management apparatus 3 estimates the value of the maintenance data from the simple data which can be acquired periodically. For example, the management apparatus 3 may select the first or third MFP 2A or 2C which is similar to the second digital multifunction apparatus 2B in the usage state by using the simple data acquired from the second digital multifunction apparatus 2B and apply the maintenance data applied to the selected MFP.

In the installation environment where there is no service which enables network connection with the external device through the communication line, the digital multifunction apparatus operates as the third and the fourth digital multifunction apparatuses 2C and 2D. For instance, in many cases, the digital multifunction apparatus operating only as the copy machine is operated as the third digital multifunction apparatus 2C or the fourth digital multifunction apparatus 2D which does not have a function of communicating with the external device. Also, in the installation environment where the network connection with the external device through the communication line is strictly restricted due to a security policy or the like, the digital multifunction apparatus is operated as the third and the fourth digital multifunction apparatuses 2C and 2D in many cases.

In the operation form in which there is no function of communicating with the external device, and only the simple data which is the target of the fee charging service performed by the operation of the serviceman can be output by the operation of the serviceman, the digital multifunction apparatus is operated as the fourth digital multifunction apparatus 2D. In addition, in the environment where the output of the data in the digital multifunction apparatus to the outside is strictly prohibited (the operation in which only the minimum information (the simple data) is output to the outside even under the direct operation of the serviceman), the digital multifunction apparatus is operated as the fourth digital multifunction apparatus 2D in many cases.

The management apparatus 3 acquires the simple data from the fourth digital multifunction apparatus 2D by the input of data performed by hand. Therefore, with respect to the fourth digital multifunction apparatus 2D, the management apparatus 3 estimates the value of maintenance data from the acquired simple data. For example, the management apparatus 3 may select the MFP having the similar usage state (the first or the third MFP 2A or 2C) by using the simple data acquired from the fourth digital multifunction apparatus 2D, and apply the maintenance data applied in the selected MFP to the fourth MFP 2D which is the source of the corresponding simple data.

The management apparatus 3 stores the data acquired from the MFP by the data communication or by hand in the storage unit. The management apparatus 3 has a function of analyzing the data acquired from the MFP. By analyzing the data acquired from the MFP, the management apparatus 3 calculates the value of the maintenance data (the diagnosis program or the parameter such as a threshold used for the diagnosis program for example) which is to be applied to each MFP 2. If the diagnosis program or the parameter such as a threshold which is to be applied to the MFP is calculated, the management apparatus 3 transmits the calculated program or the data to the MFP 2 or provides the program or the data to the serviceman P to input the program or the data to the MFP 2. In this manner, the maintenance data such as the diagnosis program and the parameter including the threshold or the like of the respective MFPs is updated to the optimal value.

Next, the configuration of the digital multifunction apparatus (MFP) 2 as the image processing apparatus that is the target of the maintenance will be described.

FIG. 2 is a view illustrating the configuration in the MFP 2.

The MFP 2 includes a scanner 100, a controller 101, a photoconductive drum 102, a charger 103, a scanning exposure unit 104, a developing unit 105, a transfer charger 106, a peel-off charger 107, a cleaner 108, a feeding unit 109, a paper transporting unit 110, a fixing unit 111, a paper discharge unit 112, and a paper discharge tray 114. A printer 120 includes the photoconductive drum 102, the charger 103, the scanning exposure unit 104, the developing unit 105, the transfer charger 106, the peel-off charger 107, the cleaner 108, the feeding unit 109, the paper transporting unit 110, the fixing unit 111, the paper discharge unit 112, and the paper discharge tray 114.

The scanner 100 acquires the image data by optically reading the image of an original document. The scanner 100 outputs the read image data to the controller 101. The controller 101 controls the respective unit. If the original document is copied, the controller 101 controls the respective unit of the printer 120 according to the image data of the original document acquired by the scanner 100, thereby forming (printing) the image of the original document on paper as a medium on which the image is formed.

The photoconductive drum 102 rotates in the sub-scanning direction (the circumferential direction of the photoconductive drum 102). The charger 103 is disposed near the periphery of the photoconductive drum 102. The charger 103 evenly charges the surface of the photoconductive drum 102. The scanning exposure unit 104 emits and turns off light according to an image signal while scanning the semiconductor laser in the scanning exposure unit 104. The laser beam emitted from the semiconductor laser is the light scanned by a deflector such as a polygon mirror in a main scanning direction (a direction of a rotation axis of the photoconductive drum 102). The laser beam is irradiated on the photoconductive drum 102 by an optical system such as a lens. If the laser beam is irradiated on the charged photoconductive drum 102, the potential of the irradiated portion decreases, whereby an electrostatic latent image is formed.

The developing unit 105 applies a developer on the photoconductive drum 102, thereby forming a toner image on the photoconductive drum 102. A paper tray 113 is provided at the bottom portion of the MFP 2. A feeding roller 115 separates paper 130 in the paper tray 113 sheet by sheet, and conveys the paper to the feeding unit 109. The feeding unit 109 feeds the paper 130 to the transfer position of the photoconductive drum 102. The transfer charger 106 transfers the toner image to the fed paper 130. The peel-off charger 107 peels the paper 130 off the photoconductive drum 102.

The paper 130 on which the toner image is transferred is transported by the paper transporting unit 110. The fixing unit 111 fixes the toner image on the paper 130. The paper discharge unit 112 discharges the paper 130 printed with the image to the paper discharge tray 114.

After the transfer of the toner image to the paper 130 is completed, the residual toner on the photoconductive drum 102 is removed by the cleaner 108, and the photoconductive drum 102 returns to the initial state to standby for the next image formation.

By repeating the above process, the image formation is performed continuously.

Next, the configuration of the control system in the MFP 2 will be described.

FIG. 3 is a block diagram illustrating an example of the configuration of the controller 101 in the MFP 2.

The controller 101 includes, for example, a CPU (a processor) 150, a ROM 151, a RAM 152, a non-volatile memory 153, a communication interface 154, a scanner controller 155, a printer controller 156, an operation panel 157, an output interface 158, and the like.

The CPU 150 is a processor, for example. The CPU 150 controls the entire corresponding MFP 2. By running the program stored in the ROM 151 or the non-volatile memory 153, the CPU 150 performs various processes. The ROM 151 stores a control program or control data, for example. The RAM 152 is used as a working memory or a buffer memory. The non-volatile memory 153 is a rewritable non-volatile memory. The non-volatile memory 153 stores a control program or control data, for example.

The non-volatile memory 153 includes the state information table 153a storing the value showing the usage state of the MFP 2. The state information table 153a stores the data used as the detailed data or the simple data. For instance, the state information table 153a stores the total counter value showing the number of times an operation (usage) of the entire corresponding MFP and each of consumables is performed. The state information table 153a also stores the life counter value for determining the life of the respective consumables. The non-volatile memory 153 stores, for example, the value detected by the respective sensors provided in the corresponding MFP 2.

The state information table 153a also stores the total counter value showing the total number of prints. The state information table 153a may store the counter value acquired by counting the respective numbers of prints performed in each printing mode (color-printing, monochromatic printing, or the like). The state information table 153a may store the number of prints for each paper size. Furthermore, the state information table 153a may store the counter value showing the number of times an operation is performed other than on the printer 120. For example, the state information table 153a may store the counter value acquired by counting the number of the original documents read by the scanner 100.

The communication interface 154 is an interface for communicating with an external device. The communication interface 154 is an interface for communicating with the management apparatus 3 through the network. The scanner controller 155 controls the scanner 100 according to instructions from the CPU 150. The printer controller 156 controls the printer 120 according to instructions from the CPU 150. The operation panel 157 is a panel to which operation instructions from a user is input. The operation panel 157 includes a display unit and operation keys. For instance, the operation panel 157 includes a display device having a touch panel and hard keys.

The output interface 158 is an interface outputting the data (spot collection data) output by the operation of the serviceman. The spot collection data may correspond to, for example, the detailed data that the first MFP periodically transmits. For example, as the spot collection data, only the data corresponding to the simple data that the second MFP periodically transmits may be made to be output by the operation of the serviceman.

The output interface 158 may be carried to the service center by the serviceman and may output the data that can be input to the management apparatus 3 by the serviceman. For instance, if an input interface 24 of the management apparatus 3 is an interface acquiring data from a storage medium such as a memory card connected locally or an external storage device, the output interface 158 may also output the detailed data or the simple data as the spot collection data to the storage medium such as a memory card connected locally or an external storage device. Moreover, if the input interface 24 of the management apparatus 3 is an interface inputting the information input by keystroke by using a key board or the like, the output interface 158 may also perform output to print the detailed data or the simple data as the spot collection data on paper by the printer 120.

Figure 4:
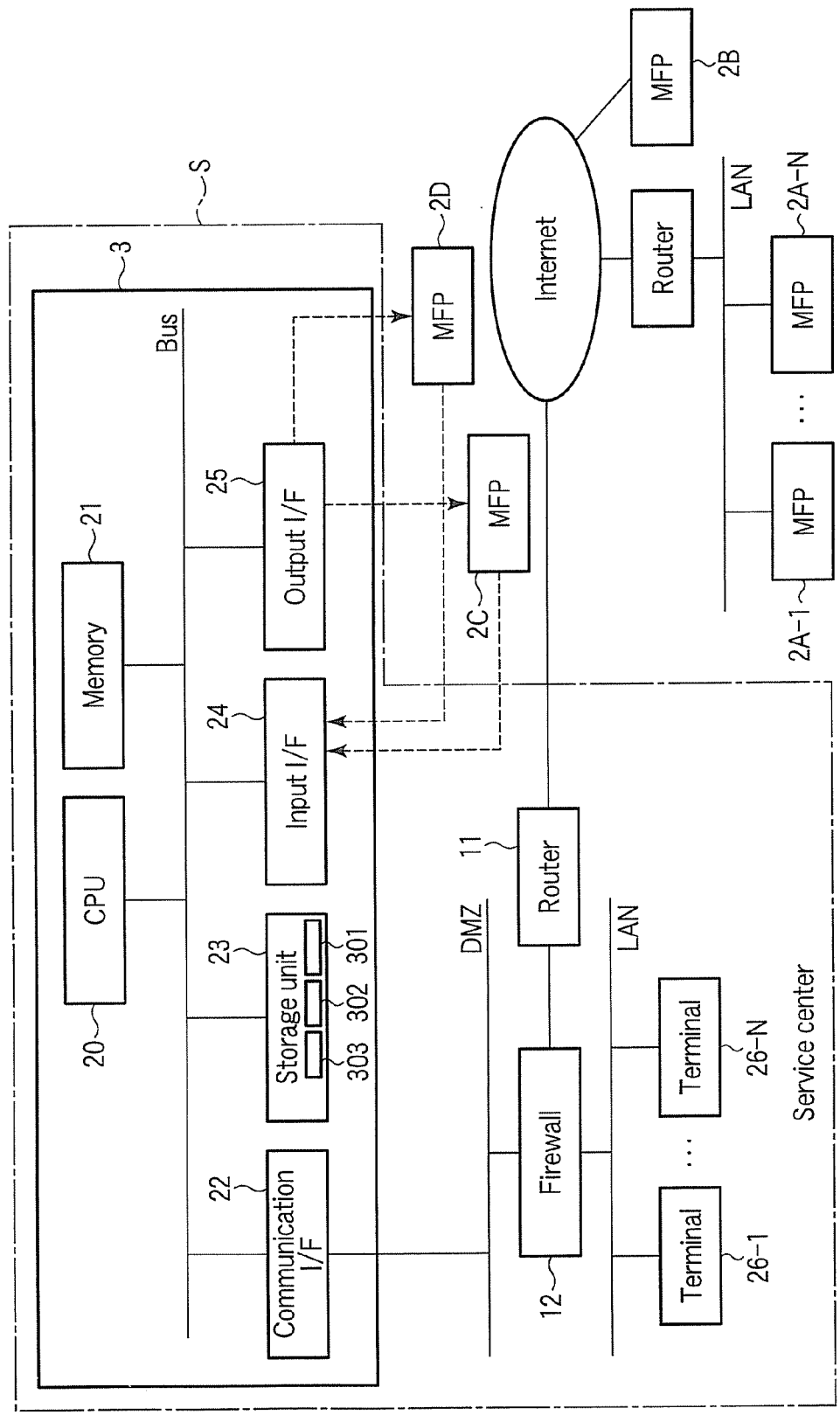
FIG. 4 is a view illustrating an example of a configuration of the maintenance system and a management apparatus.

FIG. 4 is a view illustrating an example of the configuration of the maintenance system and the management apparatus 3.

The maintenance system has the service center S where the management apparatus 3 is installed as a base, and provides a maintenance service to each MFP 2. The service center S is provided with a router 11 and a firewall 12, and excludes unauthorized access from the outside. The management apparatus 3 is installed in a demilitarized zone (DMZ) created by the firewall 12. The management apparatus 3 allows only a specific access.

The management apparatus 3 includes a CPU (a processor) 20, a memory 21, a communication interface 22, a storage unit 23, an input interface 24, and an output interface 25.

The CPU 20 controls the entire management apparatus 3. The CPU 20 also includes a function of performing various processes by running programs. The memory 21 stores the programs run by the CPU 20. For example, the memory 21 stores the program causing the CPU 20 to function as an analyzer which will be described later. Also, the programs run by the CPU 20 may be stored in the storage unit 23.

The communication interface 22 is an interface for exchanging information between the MFPs 2 through the communication line 10. The communication interface 22 also functions as an interface communicating with a terminal 26 through the firewall 12 in the service center S and LAN.

The storage unit 23 stores the data or the like acquired from each MFP 2 through the communication interface 22 or the input interface 24. The data acquired from each MFP 2 is the data relating to the maintenance history or the usage state, or the like. The storage unit 23 is provided with a management table 301 or 302 storing the data relating to each MFP 2. In addition, the storage unit 23 is provided with a data table 303 for each type of equipment.

The input interface 24 is an interface for inputting data. For instance, the input interface 24 is an interface for inputting operation instructions or data by an input device such as a keyboard or a mouse. Also, the input interface 24 may be an interface inputting the data from the storage medium such as the memory card connected locally or the external storage device. The output interface 25 is an interface for outputting information. The output interface 25 may output the data to the storage medium such as the memory card connected locally or the external storage device. Also, the output interface 25 may output the data for printing information on paper by a printer, or may output display data on a display device.

Next, the flow of data process performed in the service center S where the management apparatus 3 is installed will be described.

Figure 5:
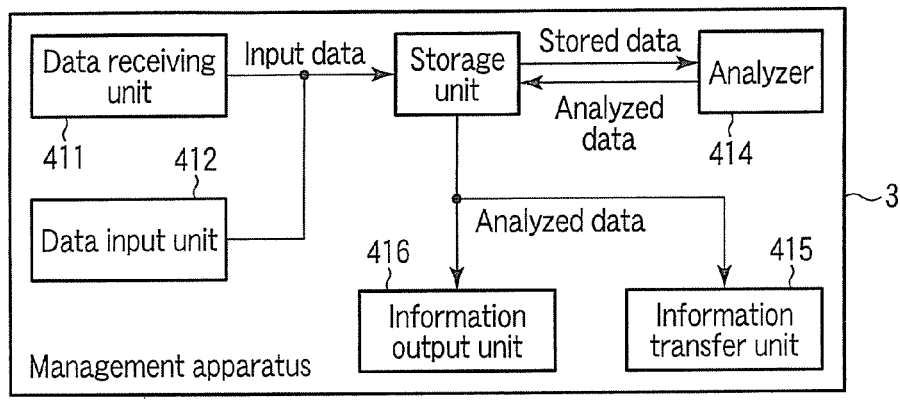
FIG. 5 is a view schematically illustrating a flow of a data process in the maintenance system.

FIG. 5 is a view schematically illustrating the flow of data process performed in the management apparatus 3 installed in the service center S. The data process illustrated in FIG. 5 may be performed not by a single management apparatus but by a plurality of management apparatuses installed in the service center S.

The management apparatus 3 receives the data transmitted by the first or the second MFP 2A or 25 by the communication interface 22 functioning as the data receiving unit 411. Furthermore, the management apparatus 3 inputs the data that the serviceman acquires from the third or the fourth MFP 2C or 2D in the input interface 24 as the data input unit 412 by the operation of the serviceman. The storage unit 23 stores the data received by the data receiving unit 411 and the data input by the data input unit 412 by associating these data with the information (for example, equipment ID) representing the MFP as an output source.

The data stored in the storage unit 413 (the data acquired from the respective MFPs) is analyzed by the analyzer 414. The function of the analyzer 414 is realized, for example, if the CPU 20 runs programs. By analyzing the data acquired from the respective MFPs, the analyzer 414 determines the maintenance data (a self diagnosis program or a parameter such as a threshold used for the maintenance) which is to be applied to the respective MFPs (the MFP as the output source of the respective data). The analyzer 414 stores analysis results (analyzed data) including the data for update which is to be applied to the MFP, in the storage unit 23 by associating the analyzed data with the information (for example, equipment ID) representing the MFP.

In other words, the analyzer 414 determines whether the maintenance data with respect to the respective MFPs is to be updated. Regarding the MFP of the maintenance data determined to be necessary to update, the analyzer 414 creates the data for update including the optimal value (the diagnosis program or the parameter such as a threshold) of the maintenance data which is to be applied. If the data for update is created, the analyzer 414 stores the analysis result including the created data for update in the storage unit 23 by associating the analysis result with the information (for example, equipment ID) representing the MFP. Regarding the MFP in which it is determined that the update is unnecessary, the analyzer 414 may store the analysis result showing that the update is unnecessary in the storage unit 23.

Among the analyzed data stored in the storage unit 23, the analyzed data including the data for update regarding the maintenance data is output by the communication interface 22 as the information transfer unit 415 or by the output interface 25 as the information output unit 416. For instance, by the information transfer unit 415, the analyzed data including the data for update of the maintenance data with respect to the first or the second MFP 2A or 2B is transmitted to the first or the second MFP 2A or 2B which is the target of the update, through the communication line 10. In the first or the second MFP 2A or 2B, the maintenance data is updated by the data for update included in the analyzed data received from the management apparatus 3 through the communication line 10.

Among the analyzed data stored in the storage unit 23, the analyzed data including the data for update of the maintenance data with respect to the third or the fourth MFP 2C or 2D is output by the information output unit 416 by the operation of the serviceman. The data for update output by the information output unit 416 is output to the third or the fourth MFP 2C or 2D which is the target of the update through the operation of the serviceman. In the third or the fourth MFP 2C or 2D, the maintenance data is updated by the data for update included in the analyzed data input by the operation of the serviceman.

Next, examples of the maintenance data which is the target of the update in the respective MFPs will be described.

The respective MFP 2 needs the maintenance operation such as the replacement of the consumable or the maintenance performed by the serviceman. For instance, the respective MFP 2 makes a self-diagnosis regarding the life of the consumables if the CPU 150 runs the diagnosis program. Based on the result of the self-diagnosis made by the diagnosis program, the MFP 2 displays guidance about the respective consumables necessary to be replaced soon, or notifies the management apparatus 3 of the guidance. In the MFP, the CPU 20 determines the life of the respective consumables by using the threshold for determination which is set for each of the consumables according to the diagnosis program. The initial values of the diagnosis program and the parameter such as the threshold or the like used for the diagnosis program (these are generally referred to as the maintenance data) are set if the MFP 2 is manufactured (if the MFP 2 is shipped from a manufacturing plant).

Here, it is not the case that the optimal values of the maintenance data such as the diagnosis program and the parameter including the threshold or the like used for the diagnosis program are necessarily set if the MFP 2 is manufactured (if the MFP 2 is shipped from a manufacturing plant). In other words, in some cases, it is more effective for the maintenance data to use the parameter (threshold) acquired by analyzing the data representing the operation state of the corresponding MFP in the market, than to use the parameter (threshold) determined if the MFP is shipped. Accordingly, the maintenance data such as the diagnosis program and the parameter including the threshold or the like used for the diagnosis program can be updated for each MFP 2.

For instance, as the function realized by the CPU 20 by means of the diagnosis program, there is a function of calculating the life of the photoconductive drum 102. As an example of the maintenance data corresponding to the function of the diagnosis program (the diagnosis program for the photoconductive drum), there is a threshold for determining the life of the photoconductive drum 102. Generally, the photoconductive drum 102 rotates not only during the printing but also during the warming-up. Hence, even if the counter value showing the number of prints is the same, the number of jobs performed varies (in other words, the number of intermittent prints varies), and the length of the life of the photoconductive drum 102 varies.

The MFP having a function of color-printing includes three photoconductive drums 102 (102C, 102M, 102Y) for three colors constituting colors and a single photoconductive drum 102 (102K) for one color used for black. If an image is printed in black, the three photoconductive drums 102 for colors do not rotate, and only the single photoconductive drum 102 for black rotates. Accordingly, if black is printed often, the life of the three photoconductive drums 102 for colors does not decrease. That is, the life of the photoconductive drum 102 in the MFP is influenced by, for example, the color ratio and the number of intermittent prints. In order to calculate the life of the photoconductive drum according to the usage state of the user, it is preferable for the diagnosis program and the threshold which are used for determining the life of the photoconductive drum to fit with the usage state or the operation purpose.

As the function realized by the CPU 20 by means of the diagnosis program, there is a function of determining the transportation state of paper by using detection results provided by a paper detection sensor installed in the MFP 2. As another example of the maintenance data corresponding to the function realized by the diagnosis program (the diagnosis program for the transportation state), there is a threshold for determining the transportation state of paper in the MFP 2. The threshold for diagnosing the transportation state is data which is to be determined according to various conditions in the actual usage state. For example, the optimal value of the threshold for determining the transportation state is set according to a combination of a plurality of conditions such as the usage state, the type of paper to be used, and the type of job to be performed.

It is not easy for the MFP to grasp all of the plurality of conditions such as the usage state, the type of paper to be used, and the type of job to be performed, before the MFP is shipped. Therefore, it is not easy to determine the threshold applied to the diagnosis program for the transportation state while encompassing various conditions before the shipment (at the time of manufacture). These actual usage conditions are acquired by analyzing the detailed data acquired from the respective operating MFP 2. In other words, the threshold according to the plurality of actual usage conditions can be calculated by acquiring the detailed data from the respective operating MFPs 2 and analyzing the acquired detailed data. In this case, it is necessary for the MFP 2 to be updated by the optimal threshold (maintenance data) that can be calculated from the result produced by analyzing the detailed data.

That is, regarding the first and third MFP 2A and 2C from which the detailed data can be acquired, the detailed data acquired from the respective MFPs is analyzed, the maintenance data such as the threshold is calculated from the analysis result, and the calculated data is stored in the storage unit 23 of the management apparatus 3. Regarding the second and fourth MFP 2B and 2D from which only the simple data can be acquired, and the detailed data cannot be acquired, the usage state is determined from the simple data. Thereafter, the maintenance data such as the threshold of the MFP 201 under the usage state which is the most similar to the usage state of corresponding MFP is selected from the maintenance data stored in the storage unit 23. In this manner, even regarding the second and fourth MFP 2B and 2D, it is possible to update the maintenance data according to the usage state and to make the optimal diagnosis, for example.

Next, a method of calculating the maintenance data which is to be applied to the respective MFPs will be described.

Figure 6:
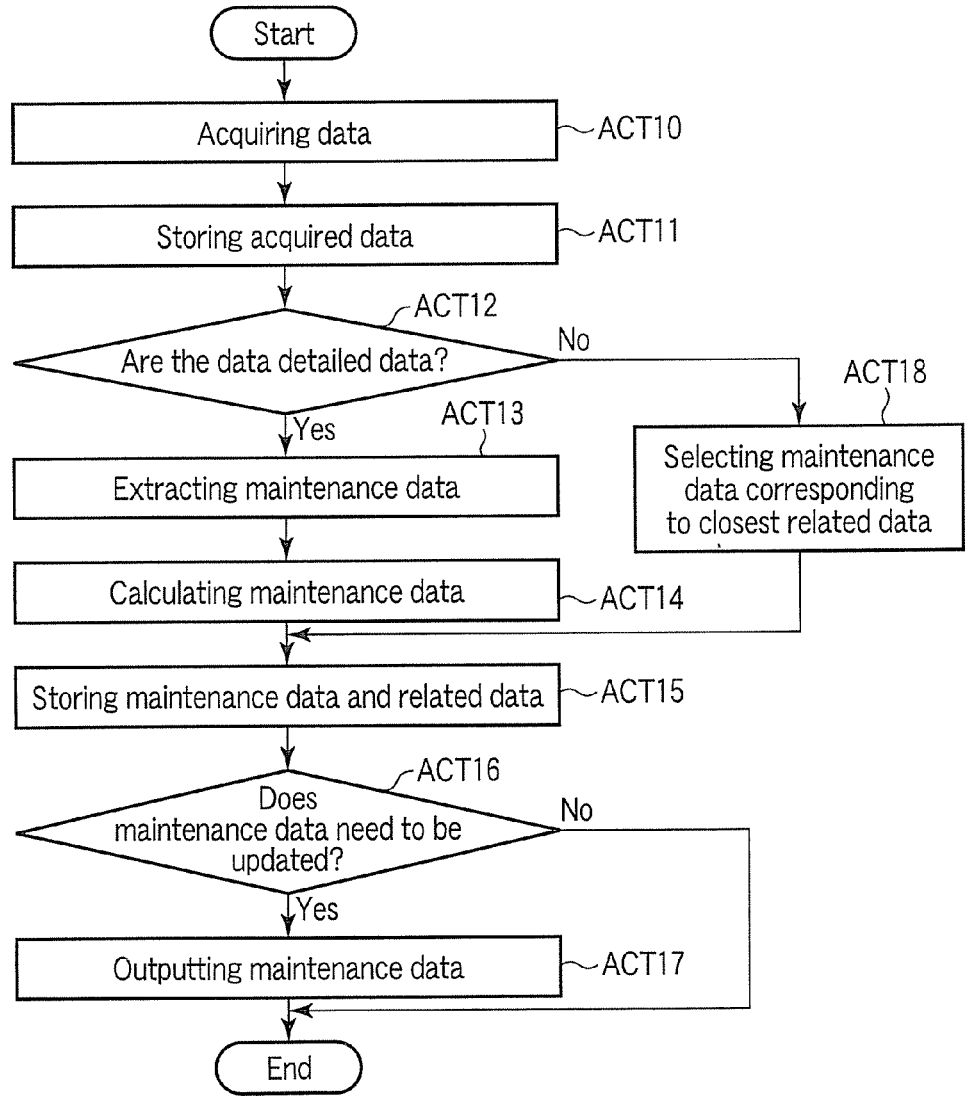
FIG. 6 is a flowchart describing a flow of a calculation of maintenance data performed with respect to each digital multifunction apparatus.

FIG. 6 is a flowchart for describing the flow of the calculation of the maintenance data performed with respect to the digital multifunction apparatus 2.

First, the CPU 20 of the management apparatus 3 acquires the data output from the MFP 2 by the data receiving unit 411 or the data input unit 412 (ACT 10). For instance, the management apparatus 3 receives the detailed data from the first MFP 2A by using the data receiving unit 411 in periodic communication performed through the communication line. The management apparatus 3 also receives the simple data from the second MFP 2B by using the data receiving unit 411 in periodic communication performed through the communication line. Furthermore, the management apparatus 3 inputs the detailed data from the third MFP 2C by using the data input unit 412, by the operation of the serviceman. The management apparatus 3 also inputs the simple data from the fourth MFP 2D by using the data input unit 412, by the operation of the serviceman.

The CPU 20 of the management apparatus 3 stores the data which is acquired from the first or the second MFP and received by the data receiving unit 411, or, the data which is acquired from the third or the fourth MFP and input by the data input unit 412 in the storage unit 23 (ACT 11). If the acquired data is the detailed data (the data acquired from the first or the third MFP) (ACT 12, YES), by using the analyzer 414, the CPU 20 of the management apparatus 3 extracts the data necessary for calculating the maintenance data (for example, the threshold of the photoconductive drum 102) to be applied to the MFP as the source from which the data is acquired, from the storage unit 23 (ACT 13).

By using the data extracted from the storage unit 23 by the analyzer 414, the CPU 20 calculates the maintenance data (for example, the threshold of the photoconductive drum 102) to be applied to the corresponding MFP (ACT 14). After calculating the maintenance data, the CPU 20 stores the calculated maintenance data and the related data (a part or all of the detailed data) used for the calculation in the storage unit 23, by associating the maintenance data and the related data with the information representing the corresponding MFP (for example, the equipment ID) (ACT 15).

By using the calculated maintenance data, the CPU 20 determines whether the maintenance data of the corresponding MFP is to be updated (ACT 16). For instance, if the current maintenance data of the corresponding MFP is not identical to the maintenance data calculated in ACT 14, the CPU 20 determines that the maintenance data of the corresponding MFP is to be updated to the maintenance data calculated in ACT 14 (ACT 16, YES).

If it is determined that the maintenance data is to be updated to the calculated maintenance data (ACT 16, YES), the CPU 20 outputs the calculated maintenance data to the target MFP (the first or the third MFP) (ACT 17). For instance, if the target of update is the first MFP 2A, the CPU 20 transmits the data for update including the maintenance data which is to be applied to the corresponding first MFP 2A, by using the information transfer unit 415. In addition, if the target of update is the third MFP 2C, the CPU 20 stores the data for update including the maintenance data which is to be applied to the third MFP 2C in the storage unit 23, as the data to be output according to the operation of the serviceman.

If the acquired data is not the detailed data, that is, if the acquired data is the simple data (the data acquired from the second or the fourth MFP) (ACT 12, NO), by using the analyzer 414, the CPU 20 selects the related data that is closest to the acquired simple data, among the related data stored in the storage unit 23 by being associated with the maintenance data (for example, the threshold of the photoconductive drum). Subsequently, the CPU 20 selects the maintenance data (for example, the threshold of the photoconductive drum) corresponding to the related data selected (ACT 18).

If the maintenance data which is to be applied to the corresponding MFP is selected, by using the selected maintenance data, the CPU 20 determines whether the maintenance data of the corresponding MFP is to be updated (ACT 16). For instance, if the current maintenance data of the corresponding MFP is not identical to the maintenance data selected in ACT 18, the CPU 20 determines that the maintenance data of the corresponding MFP is to be updated to the maintenance data selected in ACT 18 (ACT 16, YES). In this case, the CPU 20 outputs the selected maintenance data to the corresponding MFP (the second or the fourth MFP) (ACT 17). For instance, by using the information transfer unit 415, the CPU 20 transmits the data for update including the maintenance data to be applied to the second MFP 2B to the corresponding second MFP 2B. Further, the CPU 20 outputs the data for update including the maintenance data to be applied to the fourth MFP 2D by using the information output unit 416, according to the operation of the serviceman. The data output by the information output unit 416 may be stored in the storage unit 23 until the serviceman performs the operation.

Next, the maintenance data and the related data which are stored in association with the respective MFPs will be described.

FIG. 7 is a view illustrating an example of a management table 301 regarding the respective MFPs. FIG. 7 illustrates examples of the maintenance data and the related data stored in association with the respective MFPs. In FIG. 7, the threshold of the photoconductive drum 102 is illustrated an example of the maintenance data, and the color ratio is illustrated as an example of the related data.

In the management table 301 illustrated in FIG. 7, for example, the existence of the detailed data, the total counter value (TC), the color ratio, and the threshold of the respective photoconductive drum are stored by being associated with the information (equipment ID) for distinctly identifying the respective MFPs. In the example illustrated in FIG. 7, it is assumed that the color ratio (the ratio between the number of color-prints and the number of the monochromatic prints) is highly correlated with the life of the photoconductive drum.

If the color ratio is correlated with the life of the photoconductive drum, the threshold (maintenance data) for determining the life of the photoconductive drum and the color ratio (related data) are stored in the storage unit 23 in association with the respective MFPs, as shown in FIG. 7. The storage unit 23 may also store other analyzed data in association. For instance, the threshold of the photoconductive drum as the maintenance data may be stored in association not only with the color ratio but also with other related data such as the average number of intermittent prints.

That is, regarding the MFP from which the detailed data can be acquired, the management apparatus 3 stores the maintenance data (the threshold of the photoconductive drum) that can be calculated from the detailed data and the related data (the color ratio) in the storage unit 23 in an associative manner. Also, regarding the MFP from which only the simple data including the related data is acquired, the management apparatus 3 selects the MFP having the related data closest to the acquired related data (the color ratio) from the storage unit 23, and applies the maintenance data (the threshold of the photoconductive drum) with respect to the related data of the selected MFP to the corresponding MFP.

In the above example, as referred to as the threshold of the photoconductive drum and the color ratio, the maintenance data and the related data are linked to each other one-to-one. However, the maintenance data and the related data may not be linked to each other one-to-one. For example, the threshold used for the diagnosis program of the paper transportation state may be stored in association with the related data including a plurality of sorts of data such as the size of paper, the types of paper, temperature, and humidity. In this case, in order to select the closest equipment with respect to the plurality of related data, it is considered that the respective related data is converted into a vector, the angle created between the vectors is taken as a degree of similarity, and the equipment having the largest degree of similarity is selected as the closest equipment. In this manner, using the threshold of the closest equipment makes it possible to obtain appropriate maintenance diagnosis results even regarding the MFP from which the detailed data cannot be acquired.

Next, as another example of the update of the maintenance data performed on the MFP, the update of the maintenance data performed on the MFP classified into a plurality of types of equipment will be described.

In other words, as the update of the maintenance data performed on respective MFPs, the respective MFPs may be classified into several types (the types of equipment), and the maintenance data may be calculated for each type of equipment. Appropriate values of the maintenance data can be easily calculated if the values are calculated from a large amount of detailed data. Since there is a limit to the amount of the detailed data acquired from a single MFP, it is not easy to collect a large amount of detailed data from a single MFP in a certain period.

On the other hand, it is easy to collect a large amount of the detailed data if the detailed data is acquired from a plurality of MFPs classified according to the type of equipment. That is, if a large amount of detailed data is necessary for determining the appropriate maintenance data, the management apparatus 3 may classify the respective MFPs into a plurality of types of equipment, calculate the maintenance data (the diagnosis program and the parameter such as the threshold) for each type of equipment, and provide the calculated maintenance data to the respective MFPs.

First, the type of equipment will be described.

The type of equipment refers to the classification of the MFP acquired by analyzing the simple data included in the detailed data. For example, the type of equipment classifies the MFP 2 by using the MDV (monthly average number of prints), printing ratio (color ratio) between the color printing and the monochromatic printing, or the number of copies for each function.

Figures 9, 10:
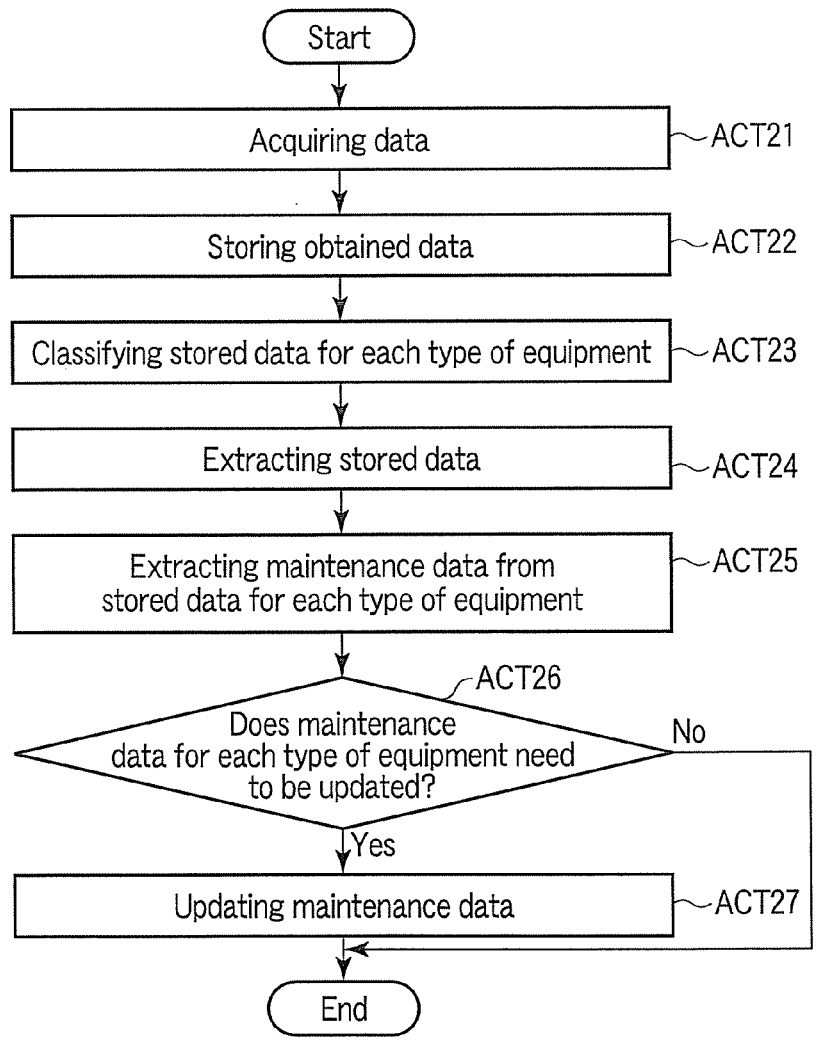
FIG. 9 is a view illustrating an example of a data table for each type of equipment storing the maintenance data of each type of equipment.
FIG. 10 is a flowchart describing the calculation of the maintenance data performed for each type of equipment.

FIG. 8 is a view illustrating an example of the management table 302 including information showing the type of equipment of the MFP. FIG. 9 is a view illustrating an example of a data table 303 for the type of equipment storing the maintenance data for each type of equipment.

FIG. 8 illustrates a classification example of the type of equipment. In the example illustrated in FIG. 8, the type of equipment, the existence of the detailed data, the total counter (TC), the MDV, the color ratio or the like is stored in the storage unit 23 in association with the information showing the respective MFPs (the equipment ID). As shown in FIG. 9, the management apparatus 3 manages the data for update (the optimal value of the maintenance data) with respect to the MFP 2, according to each type of equipment.

The maintenance data for each type of equipment is stored in storage unit 23. FIG. 9 shows an example of the maintenance data stored according to each type of equipment. In the example shown in FIG. 9, the latest maintenance data with respect to each type of equipment is stored in association with the information showing the type of equipment. The maintenance data for each type of equipment may also be stored in association with the respective MFPs, in the management table shown in FIG. 8.

FIG. 10 is a flowchart for describing the calculation of the maintenance data for each type of equipment.

First, the CPU 20 of the management apparatus 3 acquires the detailed data (ACT 21). The CPU 20 stores the acquired detailed data in the storage unit 23 (ACT 22). The CPU 20 analyzes the stored detailed data by using the analyzer 414, and based on the analysis result, the CPU 20 classifies the MFPs which are the output source of the corresponding detailed data into each type of equipment (ACT 23). After classifying the stored data into each type of equipment, in order to calculate the maintenance data of the classified each type of equipment, the CPU 20 extracts the data (detailed data) necessary for calculating the maintenance data from the data which is acquired from the respective MFPs and stored in the storage unit 23, by using the analyzer 414 (ACT 24).

For instance, from the storage unit 23, the CPU 20 extracts (collects) the detailed data from the respective MFPs that belong to the type of equipment to be a target of the maintenance data calculation. If a representative piece of equipment (described later) is selected for the type of equipment which is the target of the maintenance data calculation, the CPU 20 may extract the detailed data acquired from the MFP as the representative piece of equipment in the type of equipment which is the target of the maintenance data calculation, from the storage unit 23. After extracting the stored data of each type of equipment, the CPU 20 calculates the maintenance data of each type of equipment by using the detailed data extracted for each type of equipment by the analyzer 414 (ACT 25).

After calculating the maintenance data of each type of equipment, by using the analyzer 414, the CPU 20 determines whether the existing maintenance data of the corresponding type of equipment is to be updated to the calculated maintenance data of the type of equipment (ACT 26). If it is determined that the update of the maintenance data is necessary (ACT 26, YES), the CPU 20 updates the maintenance data of the corresponding type of equipment stored in the storage unit 23 (ACT 27). If it is determined that the update of the maintenance data is unnecessary (ACT 26, NO), the CPU 20 ends the process.

Next, the flow of the update of the maintenance data performed with respect to the MFP from which the detailed data is acquired will be described.

FIG. 11 is a flowchart for describing the update performed by using the maintenance data calculated for each type of equipment with respect to the MFP such as the first MFP 2A or the third MFP 2C from which the detailed data is acquired.

That is, the management apparatus 3 acquires the detailed data from the first MFP 2A by using the communication interface 22 as the data receiving unit 411, and acquires the detailed data from the third MFP 2C by using the input interface 24 as the data input unit 412 (ACT 31). The CPU 20 stores the detailed data acquired by the data receiving unit 411 or the data input unit 412 in the storage unit 23 (ACT 32).

By using the analyzer 414, the CPU 20 of the management apparatus 3 selects the type of equipment of the MFP as the output source of the corresponding detailed data, from the simple data included in the acquired detailed data (ACT 33). After selecting the type of equipment, the CPU 20 updates the information showing the type of equipment associated with the information which is stored in the storage unit 23 and shows the corresponding MFP (ACT 34). If there is no change in the type of equipment of the corresponding MFP stored in the storage unit 23, the CPU 20 may skip the update performed in ACT 34.

After selecting the type of equipment of the corresponding MFP, the CPU 20 further selects the most typical representative piece of equipment from the MFP of the corresponding type of equipment (ACT 35). As the representative piece of equipment of the respective type of equipment, for example, the MFP with the detailed data showing the most average value may be selected among the MFPs of the respective type of equipment. In addition, the serviceman, a manager or the like may designate the representative piece of equipment of the respective type of equipment. If there is a change in the equipment selected as the representative piece of equipment of the corresponding type of equipment, the CPU 20 updates (changes) the representative piece of equipment of the corresponding type of equipment (ACT 36). The process performed in ACT 35 and ACT 36 may also be performed if the equipment from which the detailed data is periodically acquired needs to be narrowed down due to a problem such as the capacity of the management apparatus 3. The process performed in ACT 35 and ACT 36 may also be skipped. Further, if the representative piece of equipment is selected for each type of equipment through the process performed in ACT 35 and ACT 36, the calculation of the maintenance data performed for each type of equipment through the process from ACT 21 to ACT 27 may be carried out by using the detailed data acquired from the representative piece of equipment.

After determining the type of equipment of the corresponding MFP, by using the analyzer 414, the CPU 20 determines whether the maintenance data of the corresponding MFP is to be updated to the maintenance data of the corresponding type of equipment (ACT 37). For instance, in the management apparatus 3, the maintenance data (for example, the diagnosis program or the threshold for determination used for determining the life of the consumables through the diagnosis program) for each type of equipment of the MFP is stored in a data table 303 for the type of equipment in the storage unit 23. The maintenance data for the type of equipment may also be stored in an external device (for example, a data server) that the management apparatus 3 can access. For example, by using the analyzer 414, the CPU 20 determines whether the update is necessary by determining whether the maintenance data set in the corresponding MFP is identical to the maintenance data of the type of equipment selected from the detailed data.

If it is determined that the update performed by using the maintenance data of the type of equipment selected by the detailed data is necessary (ACT 37, YES), the CPU 20 reads the maintenance data (the diagnosis program, the threshold which is to be updated, or the like) of the type of equipment of the corresponding MFP from the data table 303 for each type of equipment, and generates the data for update including the read maintenance data (ACT 38). After generating the data for update regarding the MFP, the CPU 20 outputs the data for update according to the type of the MFP to be a target of the update (ACT 39).

For instance, if the target of the update is the first MFP 2A that can perform the data communication, the CPU 20 outputs the data for update regarding the corresponding MFP to the corresponding MFP, by using the communication interface 22 as the information transfer unit 415. Also, if the target of the update is the third MFP 2C that cannot perform the data communication, according to the operation of the serviceman, the CPU 20 outputs the data for update regarding the corresponding MFP by using the output interface 25 as the information output unit 416. Further, if the target of the update is the third MFP 2C, the CPU 20 may also store the data for update regarding the corresponding MFP in the storage unit 23, so that the information output unit 416 can output the data according to the operation of the serviceman.

As described so far, the MFPs are classified according to the type of equipment, the detailed data is collected for each type of equipment. Also, the maintenance data such as the diagnosis program and the parameter including the threshold is calculated for each type of equipment by using the detailed data of each type of equipment, and the calculated maintenance data are stored for each type of equipment. If the detailed data is acquired from respective MFPs, the type of equipment is identified according to the acquired detailed data, and the data for update including the maintenance data of the type of equipment that is identified is output. In this manner, according to the present system, it is unnecessary to manage the maintenance data for every single MFP; also, the efficiency can be achieved in the calculation of the maintenance data performed by using the detailed data and in the management of the maintenance provided for each MFP.

Next, the flow of updating the maintenance data of the MFP from the simple data will be described.

Figure 12:
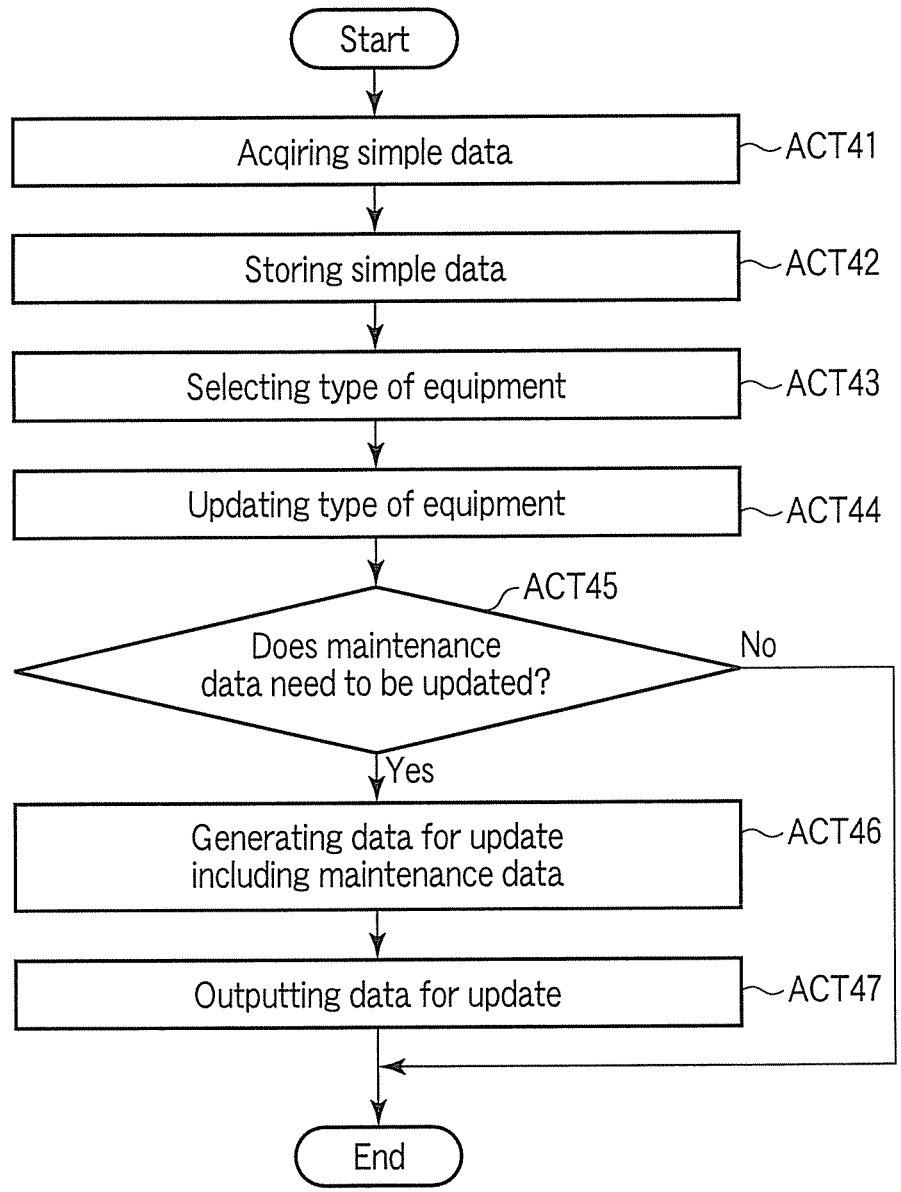
FIG. 12 is a flowchart describing the update process performed by the maintenance data for each type of equipment selected from simple data.

FIG. 12 is a flowchart for describing the update performed on the second and fourth MFP 2B and 2D from which only the simple data is acquired, by using the maintenance data for each type of equipment.

First, the management apparatus 3 acquires the simple data from the second MFP 2B by using the communication interface 22 as the data receiving unit 411, and acquires the simple data from the fourth MFP 2D by using the input interface 24 as the data input unit 412 (ACT 41). The CPU 20 stores the simple data acquired by the data receiving unit 411 or the data input unit 412 in the storage unit 23 (ACT 42).

Regarding the simple data stored in the storage unit 23, the CPU 20 of the management apparatus 3 selects the type of equipment of the MFP which is the output source of the corresponding simple data by using the analyzer 414 (ACT 43). After selecting the type of equipment, the CPU 20 updates the information showing the type of equipment associated with the information showing the corresponding MFP (ACT 44).

After determining the type of equipment of corresponding MFP, the CPU 20 determines whether the update performed by using the maintenance data for each type of the corresponding equipment is necessary, by using the analyzer 414 (ACT 45). In the management apparatus 3, the maintenance data (for example, the diagnosis program or the threshold for determination used for determining the life of the consumables through the diagnosis program) for each type of equipment of the MFP is stored in a data table 303 for the type of equipment in the storage unit 23. The maintenance data for each type of equipment may also be stored in an external device (for example, a data server) that the management apparatus 3 can access. For example, by using the analyzer 414, the CPU 20 determines whether the update is necessary by determining whether the maintenance data set in the corresponding MFP is identical to the maintenance data of the type of equipment selected from the simple data.

If it is determined that the update performed by using the maintenance data of the type of equipment selected by the simple data is necessary (ACT 45, YES), the CPU 20 reads the maintenance data (the diagnosis program, the threshold which is to be updated, or the like) of the type of equipment of the corresponding MFP from the data table 303, and generates the data for update including the read maintenance data (ACT 46). After generating the data for update regarding the MFP, the CPU 20 outputs the data for update according to the type of the MFP to be a target of the update (ACT 47).

For instance, if the target of the update is the second MFP 2B that can perform the data communication, the CPU 20 outputs the data for update regarding the corresponding MFP to the corresponding MFP, by using the communication interface 22 as the information transfer unit 415. Also, if the target of the update is the fourth MFP 2D that cannot perform the data communication, according to the operation of the serviceman, the CPU 20 outputs the data for update regarding the corresponding MFP by using the output interface 25 as the information output unit 416. Further, if the target of the update is the fourth MFP 2D, the CPU 20 may also store the data for update regarding the corresponding MFP in the storage unit 23, so that the information output unit 416 can output the data according to the operation of the serviceman.

As described so far, the data including the diagnosis program as the maintenance data regarding the respective MFPs or the parameter such as the threshold are stored according to each type of equipment. Also, regarding the second and the fourth MFPs 2 from which the detailed data cannot be acquired, the type of equipment is found from the simple data acquired from the MFPs, and the data for update including the maintenance data for each type of equipment is output. In this manner, the update of the maintenance data can be easily performed even on the second and the fourth MFPs 2 from which only the simple data can be acquired. As a result, in the entire maintenance system, it is possible to perform the maintenance by using the appropriate maintenance data even on any MFP that is under any operation form.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A management apparatus comprising:
a first acquisition unit configured to acquire detailed data including simple data from an image processing apparatus through a communication line;

a determination unit configured to determine maintenance data to be applied to the image processing apparatus which is an output source of the detailed data, if the detailed data is acquired by the first acquisition unit;

a storage unit configured to store the maintenance data determined by the determination unit in association with related data included in the detailed data;

a second acquisition unit configured to acquire the simple data which is part of the detailed data in an image processing apparatus which is unable to transmit the detailed data; and a selection unit configured to select the maintenance data associated with the related data similar to the acquired simple data as maintenance data to be applied to the image processing apparatus which is the output source of the simple data, if the simple data is acquired from the second acquisition unit.

2. The apparatus according to claim 1, wherein the determination unit determines a threshold for determining the life of consumables in the image processing apparatus.

3. The apparatus according to claim 2, wherein the image processing apparatus includes an image formation unit, and the determination unit determines the threshold for determining the life of the consumables in the image processing apparatus.

4. The apparatus according to claim 3, wherein the image formation unit includes a photoconductor as an image carrier, and the determination unit determines a threshold for determining the life of the photoconductor in the image formation unit.

5. The apparatus according to claim 3, wherein the determination unit determines a threshold for determining the life of a transporting mechanism of a medium on which the image is formed in the image formation unit.

6. The apparatus according to claim 3, wherein the simple data is data showing the number of images formed by the image formation unit.

7. The apparatus according to claim 1, further comprising:

a table configured to store the maintenance data for each type of equipment classifying the image processing apparatuses by using information included in the simple data, wherein the selection unit identifies the type of equipment from the simple data acquired by the second acquisition unit and determines the maintenance data corresponding to the identified type of equipment from the table.

8. The apparatus according to claim 7, wherein the determination unit calculates the maintenance data for each corresponding type of equipment by using the detailed data collected for each type of equipment, and updates the table by using the calculated maintenance data.

9. The apparatus according to claim 8, wherein the determination unit calculates the maintenance data for each corresponding type of equipment by using the detailed data collected from a single image processing apparatus which is a piece of representative piece of equipment for each type of equipment, and updates the table by using the calculated maintenance data.

10. The apparatus according to claim 9, wherein the determination unit selects the representative piece of equipment in each type of equipment by using the detailed data acquired from each image processing apparatus.

11. A maintenance system comprises a first image processing apparatus, a second image processing apparatus and a management apparatus, the first image processing apparatus comprising:

a transmission unit configured to transmit detailed data including the simple data showing the usage state of the first image processing apparatus to the management apparatus via a network, and the second image processing apparatus comprising:

an output unit configured to output the simple data in the second image processing apparatus, the management apparatus comprising:

a first acquisition unit configured to acquire detailed data including the simple data the first image processing apparatus through a communication line, a determination unit configured to determine maintenance data to be applied to an image processing apparatus which is an output source of the detailed data, if the detailed data is acquired by the first acquisition unit;

a storage unit configured to store the maintenance data determined by the determination unit in association with related data included in the detailed data;

a second acquisition unit configured to acquire the simple data output by the second image processing apparatus; and a selection unit configured to select the maintenance data associated with the related data similar to the acquired simple data as maintenance data to be applied to the image processing apparatus which is the output source of the simple data, if the simple data is acquired from the second acquisition unit.

12. The system according to claim 11, each of the image processing apparatuses further comprising:

consumables which are to be subjected to the maintenance according to the maintenance data, and wherein the determination unit of the management apparatus determines a threshold for determining the life of the consumables in the image processing apparatus.

13. The system according to claim 11, the management apparatus comprising: a table configured to store the maintenance data for each type of equipment classifying each of the image processing apparatus by using information included in the simple data, and wherein the selection unit of the management apparatus identifies the type of equipment from the simple data acquired by the second acquisition unit and determines the maintenance data corresponding to the identified type of equipment from the table.

14. The system according to claim 13, wherein the determination unit of the management apparatus calculates the maintenance data for each corresponding type of equipment by using the detailed data collected for each type of equipment, and updates the table by using the calculated maintenance data.

15. The system according to claim 14, wherein the determination unit of the management apparatus calculates the maintenance data for each type of equipment by using the detailed data collected from a single image processing apparatus which is a piece of representative piece of equipment for each type of equipment, and updates the table by using the calculated maintenance data.

16. A maintenance method of an image processing apparatus comprising:

acquiring detailed data including the simple data from an image processing apparatus through a communication line;

determining maintenance data to be applied to an image processing apparatus which is an output source of the detailed data, if the detailed data is acquired;

storing the determined maintenance data in a memory in association with related data included in the corresponding detailed data;

acquiring the simple data which is part of the detailed data in an image processing apparatus which is unable to transmit the detailed data; and selecting the maintenance data associated with the related data similar to the acquired simple data from the memory as maintenance data to be applied to the image processing apparatus which is the output source of the simple data, if the simple data is acquired.

17. The method according to claim 16,
wherein the determining determines the threshold for determining the life of consumables in the image processing apparatus as the maintenance data.

18. The method according to claim 16, further comprising:
storing the maintenance data for each type of equipment classifying the image processing apparatuses by using the information included in the simple data in a table,
wherein the selecting identifies the type of equipment from the acquired simple data and determines the maintenance data corresponding to the identified type of equipment from the table.

19. The method according to claim 18,
wherein the determining calculates the maintenance data for each corresponding type of equipment by using the detailed data collected for each type of equipment, and updates the table by using the calculated maintenance data.

20. The method according to claim 18,
wherein the determining calculates the maintenance data for each type of equipment by using the detailed data collected from a single image processing apparatus which is a piece of representative piece of equipment for each type of equipment, and updates the table by using the calculated maintenance data.

* * * * *